United States Patent
Bhaskara et al.

(10) Patent No.: US 12,312,188 B2
(45) Date of Patent: May 27, 2025

(54) APPARATUS FOR ORGANIZED LOADING, AND UNLOADING OF OBJECTS

(71) Applicant: Tata Consultancy Services Limited, Mumbai (IN)

(72) Inventors: Mohan Bhaskara, Bangalore (IN); Mahesha Gunmi, Bangalore (IN); Ullas Chennabettu Keshava, Bangalore (IN); Babu Unnikrishnan, Chennai (IN); Mahesh Mittalakatte Chikkappa, Bangalore (IN); Sridhar Jayaraman, Chennai (IN)

(73) Assignee: TATA CONSULTANCY SERVICES LIMITED, Mumbai (CN)

( * ) Notice: Subject to any disclaimer, the term of this patent is extended or adjusted under 35 U.S.C. 154(b) by 0 days.

(21) Appl. No.: 18/407,948

(22) Filed: Jan. 9, 2024

(65) Prior Publication Data

US 2024/0228196 A1    Jul. 11, 2024

(30) Foreign Application Priority Data

Jan. 9, 2023  (IN) .............. 202321001854

(51) Int. Cl.
| | | |
|---|---|---|
| *B65G 47/91* | (2006.01) | |
| *B65G 61/00* | (2006.01) | |
| *B65G 67/02* | (2006.01) | |

(52) U.S. Cl.
CPC ............. *B65G 61/00* (2013.01); *B65G 47/91* (2013.01); *B65G 67/02* (2013.01)

(58) Field of Classification Search
CPC ........ B65G 67/08; B65G 67/24; B65G 67/02; B65G 47/91; B65G 67/20;
(Continued)

(56) References Cited

U.S. PATENT DOCUMENTS 3,790,003 A * 2/1974 Tausheck ............. B65G 49/067
  414/737
4,093,083 A * 6/1978 Klaus ................... B65G 49/068
  271/103
(Continued)

FOREIGN PATENT DOCUMENTS

| CN | 110683368 A | 1/2020 |
| CN | 111776941 A | 10/2020 |

(Continued)

OTHER PUBLICATIONS

Kay, "Material Handling Equipment," North Carolina State University (2012).

*Primary Examiner* — Gregory W Adams
(74) *Attorney, Agent, or Firm* — FINNEGAN, HENDERSON, FARABOW, GARRETT & DUNNER LLP

(57) ABSTRACT

Conventionally, most equipment manipulating object have been huge with rotatable pivot platforms, multiple roller conveyors, telescopic boom conveyors, hydraulic cranes, etc. These systems may have higher lifecycle cost due to their size and bill of materials (BoM) count and have limited themselves to handling either loading or unloading and lack to perform both the operations. Present disclosure provides apparatus for organized loading and unloading of objects. The apparatus addresses the issue of single equipment for both loading, unloading, and further automatically organizes the objects in bulk thus ensuring safety, without damages. The objects are placed optimally while being unloaded onto pallets or other carriers. While loading into a container, the objects are loaded to a greater fill volume. These operations of multiple objects handling in one go are enabled through (Continued)

various belt conveyors, manipulators, vacuum generators, suction panels, object gripping and conveying platforms, and object gripping systems.

10 Claims, 13 Drawing Sheets

(58) Field of Classification Search
CPC .......... B65G 2203/041; B65G 2249/04; B65G 47/52; B25J 9/0093; B25J 15/0616; B25J 15/0052; B25J 5/007
See application file for complete search history.

(56) References Cited

U.S. PATENT DOCUMENTS

| | | | |
|---|---|---|---|
| 5,030,059 A * | 7/1991 | Favre | B65G 49/068 |
| | | | 414/737 |
| 5,984,624 A * | 11/1999 | Opfer | B65G 49/068 |
| | | | 414/737 |
| 10,099,867 B2 * | 10/2018 | Ge | B65G 47/763 |
| 10,336,562 B2 * | 7/2019 | Girtman | B65G 67/26 |
| 10,457,490 B2 * | 10/2019 | Nakamoto | B65G 41/003 |
| 2007/0201971 A1 * | 8/2007 | Meijer | B65G 69/22 |
| | | | 414/679 |

FOREIGN PATENT DOCUMENTS

| | | | | |
|---|---|---|---|---|
| CN | 112124987 A | 12/2020 | | |
| CN | 113291774 A | 8/2021 | | |
| CN | 113800282 A | 12/2021 | | |
| CN | 114261669 A | 4/2022 | | |
| DE | 102010015299 A1 * | 10/2011 | | B65G 65/02 |
| EP | 1 639 512 B1 | 10/2009 | | |
| KR | 10-2017-0097982 | 8/2017 | | |
| WO | WO-2020243749 A1 * | 12/2020 | | B65G 21/12 |
| WO | WO 2022/047781 A1 | 3/2022 | | |
| WO | WO 2022/027980 A1 | 10/2022 | | |

\* cited by examiner

APPARATUS FOR ORGANIZED LOADING, AND UNLOADING OF OBJECTS

PRIORITY CLAIM

This U.S. patent application claims priority under 35 U.S.C. § 119 to: Indian Patent Application No. 202321001854, filed on Jan. 9, 2023. The entire contents of the aforementioned application are incorporated herein by reference.

TECHNICAL FIELD

The disclosure herein generally relates to object manipulation, and, more particularly, to an apparatus for organized loading, and unloading of objects in an environment.

BACKGROUND

Loading of objects in large containers or constrained environments is a challenging task. Conventionally, there have been truck loading and unloading equipment made available. However, such equipment can only perform one type of operation either loading or unloading. In other words, the equipment lacks capabilities of doing both loading and unloading operations. Additionally, these loading and unloading operations performed by individual equipment involve single object handling at a given instance and fail to handle multiple objects at a time. This leads to additional cost and labor time, and dependency on other infrastructure constraints.

SUMMARY

Embodiments of the present disclosure present technological improvements as solutions to one or more of the above-mentioned technical problems recognized by the inventors in conventional systems.

For example, in one aspect, there is provided an apparatus for organized loading, and unloading of objects. The apparatus comprises a loading and unloading platform (LUP); a multi-panel object holding and conveying platform (MPOHCP) connected to the LUP; a first roller conveyor (FRC) and a second roller conveyor (SRC) mounted on the LUP, each of the FRC and the SRC comprises a first end (front) and a second end (rear), wherein the second end of the FRC is connected to the first end of the SRC, and wherein each of the FRC and the SRC comprises of a plurality of wheels on a plurality of caster wheel legs respectively; a drive mechanism connected to the LUP and the MPOHCP, wherein the drive mechanism is configured to rotate the MPOHCP from a first direction (vertical) to a second direction (horizontal); a Unit Drive System (UDS) configured to move the LUP and the MPOHCP in one or more directions based on at least one of a first operation and a second operation being performed by the apparatus; a first m-axis collaborative manipulator (FMACM) and a second m-axis collaborative manipulator (SMACM) mounted on the FRC and the SRC, respectively; a bridge conveyor (BC) connected to the first end of the FRC; a placement actuator configured to lift and lower the BC; one or more object gripping and conveying systems (OGCS), wherein each of the OGCS comprises a split belt conveyor (SBC), and wherein the SBC is operated by a drum motor and lifted and lowered by a split belt lift mechanism (SLM); one or more object gripping systems (OGS) mounted on the one or more OGCS respectively, wherein the each of the OGS comprises a plurality of suction panels; one or more vacuum generators configured to generate vacuum for the plurality of suction panels; and an object gripping panel lift mechanism (OGPLM) configured to lift or lower the plurality of suction panels for performing at least one of the first operation (loading) and the second operation (unloading) of one or more objects from a first zone to a second zone.

In an embodiment, during the first operation and the second operation a last caster wheeled legs of the SRC is configured in a first position (locked position) and remaining caster wheel legs of the SRC and the one or more caster wheel legs of the FRC are configured in a second position (unlocked position).

In an embodiment, the drive mechanism comprises: a first link comprising a first joint, a second joint, and a third joint, wherein the first joint is connected to a specific location of the MPOHCP and the third joint is connected to a pivot mounted on the LUP; a second link comprising a first end and second end, wherein the first end of the second link is connected to the first link via the second joint and the second end of the second link is connected to a crank that is driven by a motor comprising a brake and an encoder, wherein the motor is mounted on the LUP.

In an embodiment, the first m-axis collaborative manipulator (FMACM) is mounted on the first end of the FRC, and the second m-axis collaborative manipulator (SMACM) is mounted on the second end of the SRC, respectively.

In an embodiment, wherein during the first operation (loading), the drive mechanism is configured to rotate the MPOHCP to a third direction (CW), the BC, the FRC and the SRC are configured to rotate in a fourth direction (CCW) to convey one or more objects on the MPOHCP, the placement actuator is configured to (i) lower the BC and (ii) connect at least one end (front end) of the FRC, wherein a drum motor is configured to rotate the one or more rollers of the BC in the fourth direction (CCW), and wherein one or more motors connected to the FRC and the SRC respectively are configured to rotate one or more associated rollers in the fourth direction (CCW) to enable placement of the one or more objects on the MPOHCP, the SMACM is configured to pick and place the one or more objects from an initial position on to the SRC, wherein the one or more objects are uniformly distributed by the FMACM based on a size of the one or more objects and space available on the MPOHCP, the drive mechanism is configured to (i) rotate the MPOHCP in the fourth direction (CCW), and (ii) release vacuum for stacking the one or more objects, wherein the one or more objects are pushed by a push mechanism, and the drive mechanism is configured to rotate the MPOHCP in the third direction (CW), and the UDS is configured to move the apparatus to a specific direction for a subsequent operation.

In an embodiment, during the second operation (unloading), the plurality of suction panels is positioned using the OGPLM based on the distance of one or more objects from the plurality of suction panels for gripping the one or more objects, the distance of the one or more objects being determined by a vision system, the SLM (Split belt Lift Mechanism) is in the lower position to allow suction cups of all the plurality of suction panels to grip the objects, the MPOHCP is configured to move forward for stabilization of remaining objects, by an Unit drive system (UDS), the drive mechanism is configured to rotate the MPOHCP in the third direction (CW) for placement of the one or more objects from the second zone to the first zone, the OGPLM lowers the one or more objects on the MPOHCP to a default level in line to transfer to the BC, the SLM (Split belt Lift Mechanism) is configured to lift all the SBC to the default level in line with the BC, the plurality of suction panels releases vacuum to enable resting of the one or more objects on the SBC; the SBC, BC, the FRC and the SRC are configured to rotate in a third direction (CW), if any one or more objects are cluttered the FMACM detects such objects and will place appropriately on FRC, else the one or more objects are conveyed from the SBC to BC towards the FRC and the SRC, the SMACM is configured to pick the one or more objects from the SRC for placement in desired location, and the UDS is configured to move the apparatus to a specific direction for a subsequent operation.

The apparatus further comprises a platform hinged to the LUP.

In an embodiment, during transportation of the apparatus, the platform is configured as a stopper.

In an embodiment, during a setting up of the apparatus, the platform is configured at a specific angle to disembark the FRC and the SRC.

The apparatus further comprises a jack system that is connected underneath the UDS.

In an embodiment, the jack system is configured to level the apparatus with reference to a ground surface and lift the apparatus to a desired position.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
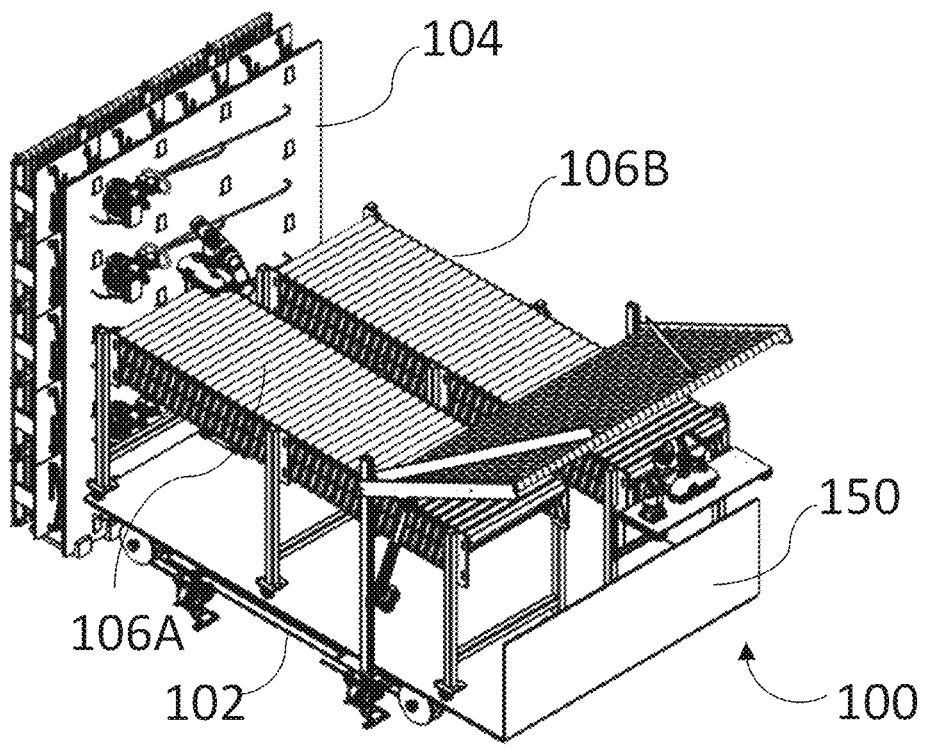
FIG. 1 depicts an exemplary apparatus for organized loading and unloading of objects.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIGS. 1 through 16, where similar reference characters denote corresponding features consistently throughout the figures, there are shown preferred embodiments and these embodiments are described in the context of the following exemplary system and/or method.

Reference numerals of one or more components of the apparatus as depicted in the FIGS. 1 through 16 are provided in Table 1 below for ease of description:

TABLE 1

| Sl. No | Component | Numeral reference |
|---|---|---|
| 1 | Apparatus | 100 |
| 2 | A loading and unloading platform (LUP) | 102 |
| 3 | A multi-panel object holding and conveying platform (MPOHCP) | 104 |
| 4 | A first roller conveyor (FRC) | 106A |
| 5 | A second roller conveyor (SRC) | 106B |
| 6 | A plurality of wheels | 108A-N |
| 7 | A plurality of caster wheel legs | 110A-N |
| 8 | A drive mechanism | 112 |
| 9 | A Unit Drive System (UDS) | 114 |
| 10 | A first m-axis collaborative manipulator (FMACM) | 116A |
| 11 | A second m-axis collaborative manipulator (SMACM) | 116B |
| 12 | A bridge conveyor | 118 |
| 13 | A placement actuator | 120 |
| 14 | One or more object gripping and conveying systems (OGCS) | 122A-N |
| 15 | A split belt conveyor (SBC) | 124 |
| 16 | One or more object gripping systems (OGS) | 126 |
| 17 | A plurality of suction panels | 128A-N |
| 18 | One or more vacuum generators | 130 |

TABLE 1-continued

| Sl. No | Component | Numeral reference |
|---|---|---|
| 19 | Object gripping panel lift mechanism (OGPLM) | 132 |
| 20 | A split belt lift mechanism (SLM) | 134 |
| 21 | A first link of the drive mechanism | 136 |
| 22 | A first joint of the first link | 138 |
| 23 | A second joint of the first link | 140 |
| 24 | A third joint of the first link | 142 |
| 25 | A second link of the drive mechanism | 144 |
| 26 | One or more vision cameras/vision system | 146 |
| 27 | A jack system | 148 |
| 28 | A platform | 150 |

FIG. 1 depicts an exemplary apparatus 100 for organized loading and unloading of objects. The apparatus 100 comprises a loading and unloading platform (LUP) 102. The LUP 102 serves as a base platform on which other components of the apparatus 100 are mounted, attached, or carried. The LUP 102 also houses FRC 106A the SRC 106B during transport. During one or more operations being carried as intended, the LUP 102 is moved in and out of an environment (e.g., a constrained environment such as a truck container, and the like) by a driving system associated with the apparatus 100.

Figure 2:
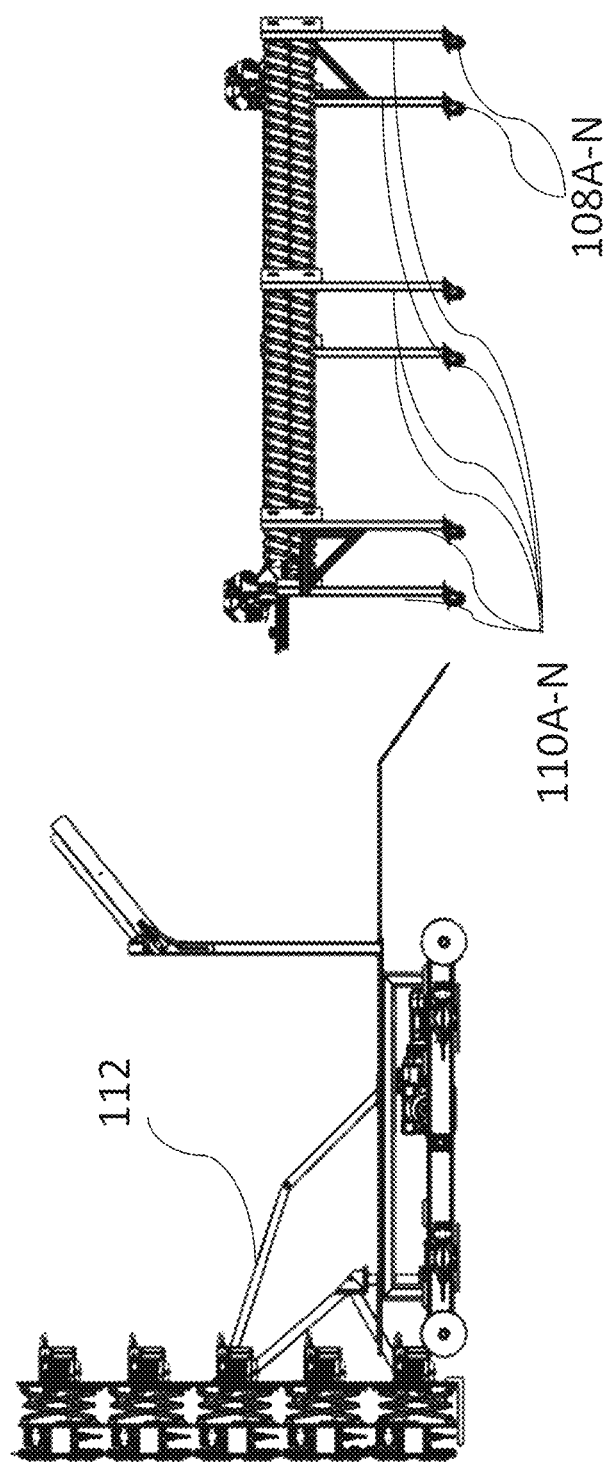
FIG. 2 illustrates the apparatus comprising a drive mechanism, a plurality of wheels on a plurality of caster wheel legs respectively, in accordance with an embodiment of the present disclosure.
Figure 3:
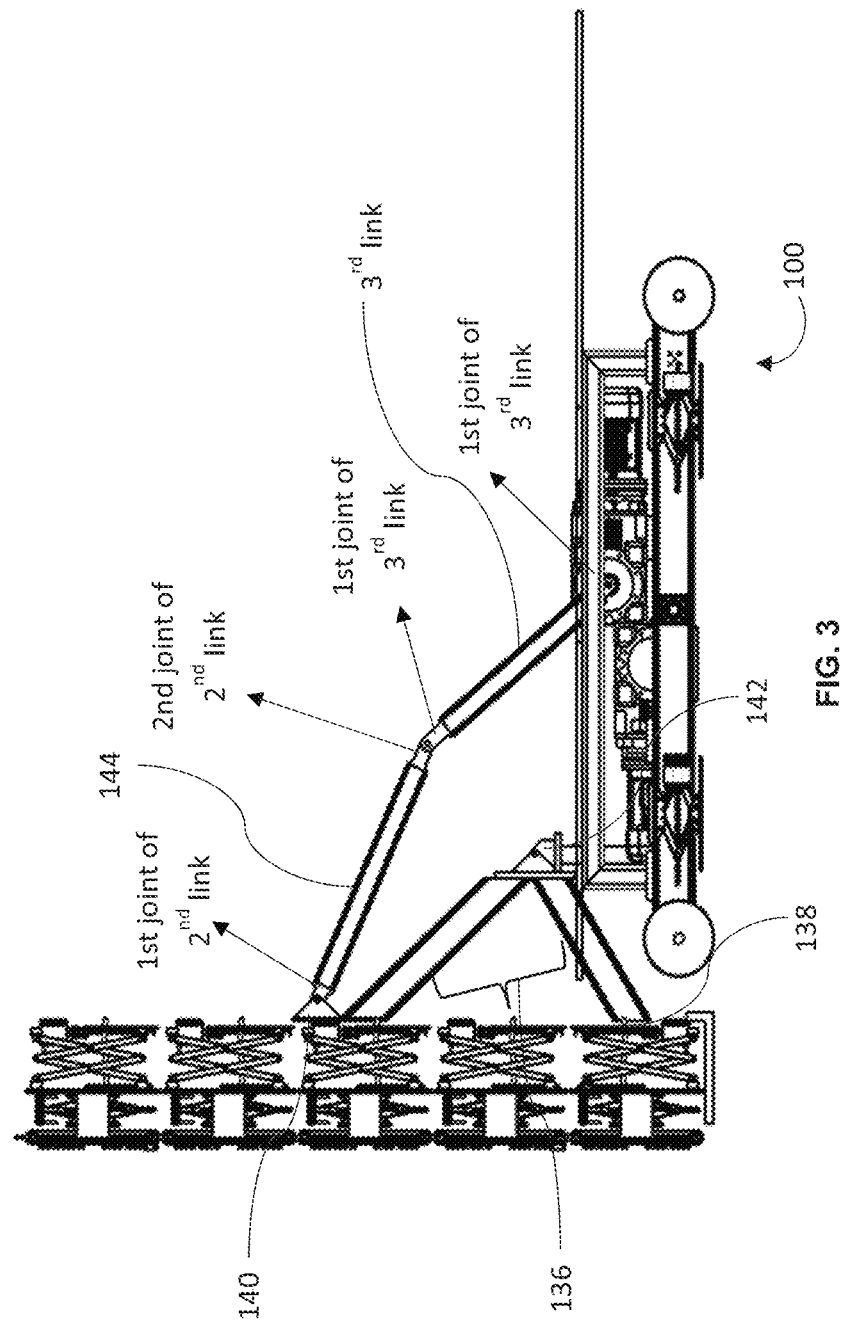
FIG. 3 illustrates various components (e.g., links and joints) of the drive mechanism of the apparatus of FIG. 1, in accordance with an embodiment of the present disclosure.

The apparatus 100 further comprises a multi-panel object holding and conveying platform (MPOHCP) 104 connected to the LUP 102. The MPOHCP 104 is attached to the LUP 102 by a drive mechanism 112. The drive mechanism 112 is configured to rotate the MPOHCP from a first direction (e.g., a vertical direction) to a second direction (e.g., a horizontal direction). FIG. 2 illustrates the apparatus 100 with the drive mechanism 112 comprised therein, in accordance with an embodiment of the present disclosure. In the present disclosure, the drive mechanism 112 is a multi-bar mechanism (e.g., 4-bar mechanism) and is further configured to rotate MPOHCP from vertical to horizontal direction as mentioned above. The drive mechanism 112 comprises a first link 136 comprising a first joint 138, a second joint 140, and a third joint 142. The first joint 138 is connected to a specific location of the MPOHCP 104, and the third joint 142 is connected to a pivot mounted on the LUP 102. The drive mechanism 112 further comprises a second link 144 comprising a first end and second end. The first end of the second link 144 is connected to the first link 136 via the second joint 140 and the second end of the second link 144 is connected to a crank that is driven by a motor comprising a brake and an encoder. The motor is mounted on the LUP 102. In other words, the three links configuration constitute a tertiary link (also referred as output link) with two of its links attached to the rear of the MPOHCP 104 and one fixed to the pivot mounted on the LUP 102. FIG. 3 illustrates various components (e.g., links and joints) of the drive mechanism 112 of the apparatus of FIG. 1, in accordance with an embodiment of the present disclosure.

The apparatus 100 further comprises a first roller conveyor (FRC) 106A and a second roller conveyor (SRC) 106B. The FRC 106A and the SRC 106B are mounted on the LUP 102. Each of the FRC 106A and the SRC 106B comprises a first end (e.g., a front end) and a second end (e.g., a rear end). The first end of the FRC 106A is connected to the BC 118 and the second end of the FRC 106A is connected to the first end of the SRC 106B. Each of the FRC 106A and the SRC 106B comprises of a plurality of wheels 108A-N on a plurality of caster wheel legs 110A-N respectively. The plurality of wheels 108A-N and the plurality of caster wheel legs 110A-N respectively are depicted in FIG. 2. More specifically, FIG. 2 illustrates the apparatus 100 comprising the drive mechanism 112, the plurality of wheels 108A-N on the plurality of caster wheel legs 110A-N respectively, in accordance with an embodiment of the present disclosure.

The FRC 106A is a flexible roller conveyor and may include/comprise a plurality of rollers on the conveyor. The FRC 106A can compress to around 'x' meter and expand up to 'y' meter. The values of 'x' and 'y' may be either identical or different from each other. For instance, if values of 'x' and 'y' are 3 and 8 meters respectively, the in such scenarios, the FRC 106A may compress to 3 meters and expand up to 8 meters accordingly. The rollers on the FRC 106A can rotate in either direction (e.g., clockwise (CW) or counterclockwise (CCW) directions) based on the one or more operations being performed (e.g., loading and/or unloading operations). The FRC 106A moves on certain pairs of caster wheels (for e.g., 3 pairs) which can be locked. Similarly, the SRC 106B is also configured as mentioned above with rollers and has similarly capabilities to compress and/or expand as that of the FRC 106A. Both the FRC 106A and the SRC 106B are configured/operated by the apparatus 100 for object movement from a first location (e.g., one location) to a second location (e.g., another location) In one scenario, the object movement may happen within a constrained environment. In other scenarios, the object movement may happen from the constrained environment (e.g., say first location) to a bay (e.g., second location), or vice-versa.

Figure 4:
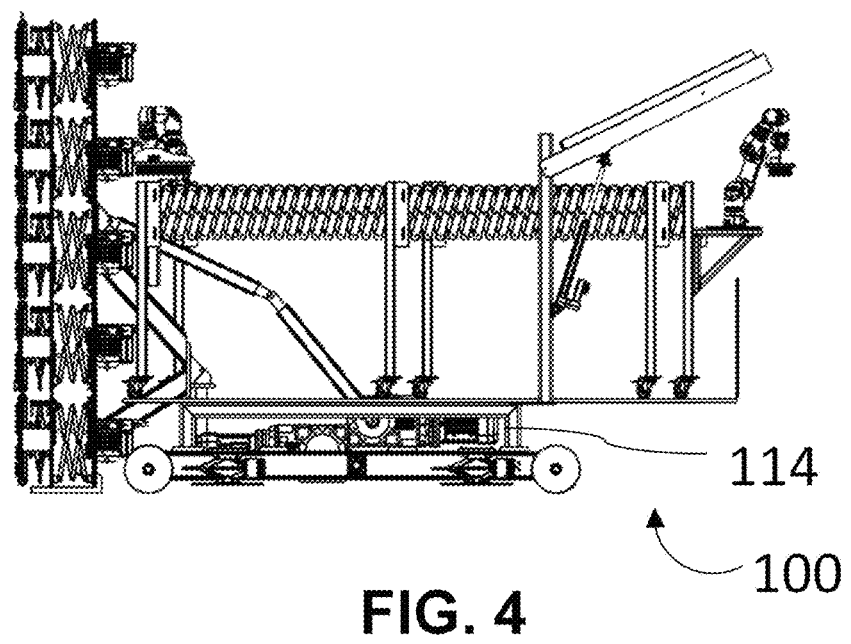
FIG. 4 illustrates the apparatus with a unit drive system, in accordance with an embodiment of the present disclosure.

The apparatus 100 further comprises a unit drive system (UDS) 114. The UDS 114 moves the LUP 102 and the MPOHCP 104 in one or more directions based on a first operation, and/or a second operation respectively being performed by the apparatus 100. FIG. 4 illustrates the apparatus 100 with the unit drive system 112, in accordance with an embodiment of the present disclosure.

Figure 5:
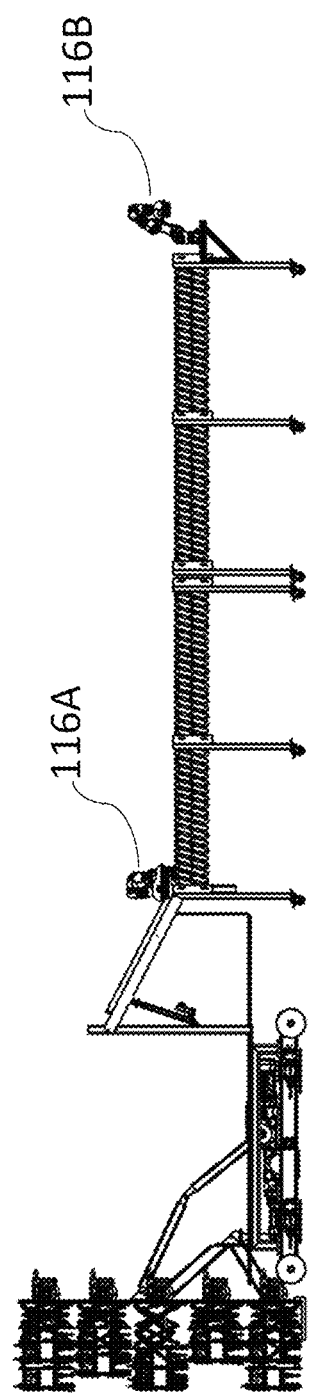
FIG. 5 illustrates the apparatus with a first m-axis collaborative manipulator (FMACM) and a second m-axis collaborative manipulator (SMACM), in accordance with an embodiment of the present disclosure.
Figure 6:
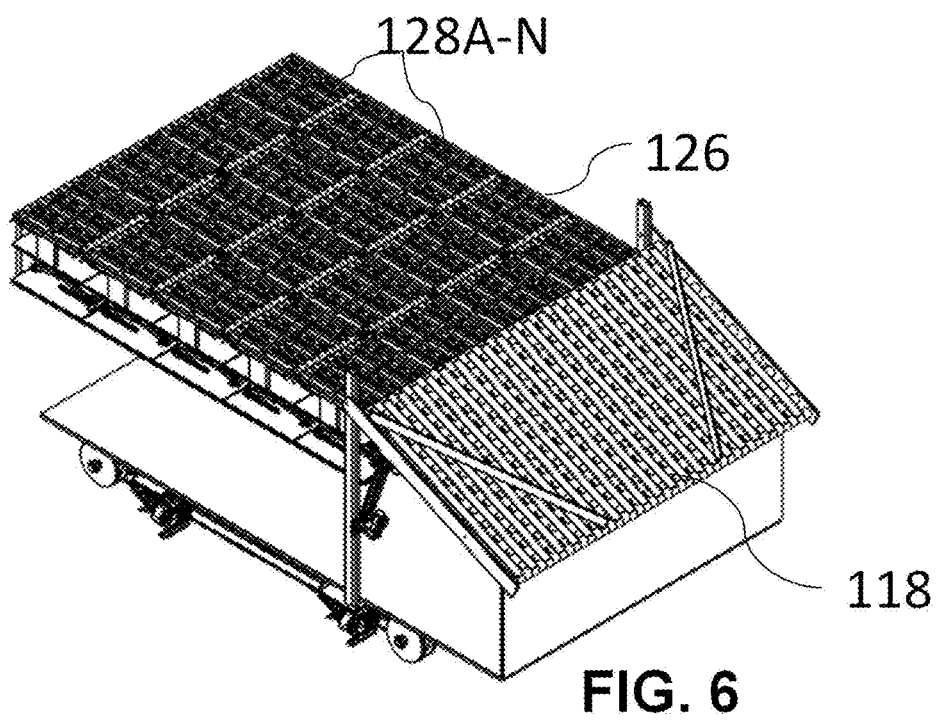
FIG. 6 illustrates at least a portion of the apparatus depicting a bridge conveyor and a plurality of suction panels, in accordance with an embodiment of the present disclosure.

The apparatus 100 further comprises a first m-axis collaborative manipulator (FMACM) 116A and a second m-axis collaborative manipulator (SMACM) 116B mounted on the FRC 106A and the SRC 106B, respectively. The first m-axis collaborative manipulator (FMACM) 116A and the second m-axis collaborative manipulator (SMACM) 116B are a 6-axis collaborative manipulator (e.g., a robot, a cobot, and the like), in an embodiment of the present disclosure. FIG. 5 illustrates the apparatus 100 with the first m-axis collaborative manipulator (FMACM) 116A and the second m-axis collaborative manipulator (SMACM) 116B, in accordance with an embodiment of the present disclosure. The first m-axis collaborative manipulator is mounted at the front end of FRC 106A wherein the front end of FRC 106A is connected to a bridge conveyor (BC) 118. FIG. 6 illustrates at least a portion of the apparatus 100 depicting the bridge conveyor 106 and a plurality of suction panels, in accordance with an embodiment of the present disclosure. As mentioned above the bridge conveyor is connected to the FRC 106A. The front end of the SRC 106B is connected to FRC 106A and at the rear end of the second m-axis collaborative manipulator (SMACM) 116B is fixed. During an operation the last pair of legs are locked. More specifically, during the first operation and the second operation a last caster wheel leg of the SRC 106B is configured in a first position (e.g., a locked position) and remaining caster wheel legs of the SRC 106B and the one or more caster wheel legs of the FRC 106A are configured in a second position (e.g., an unlocked position).

Figure 7:
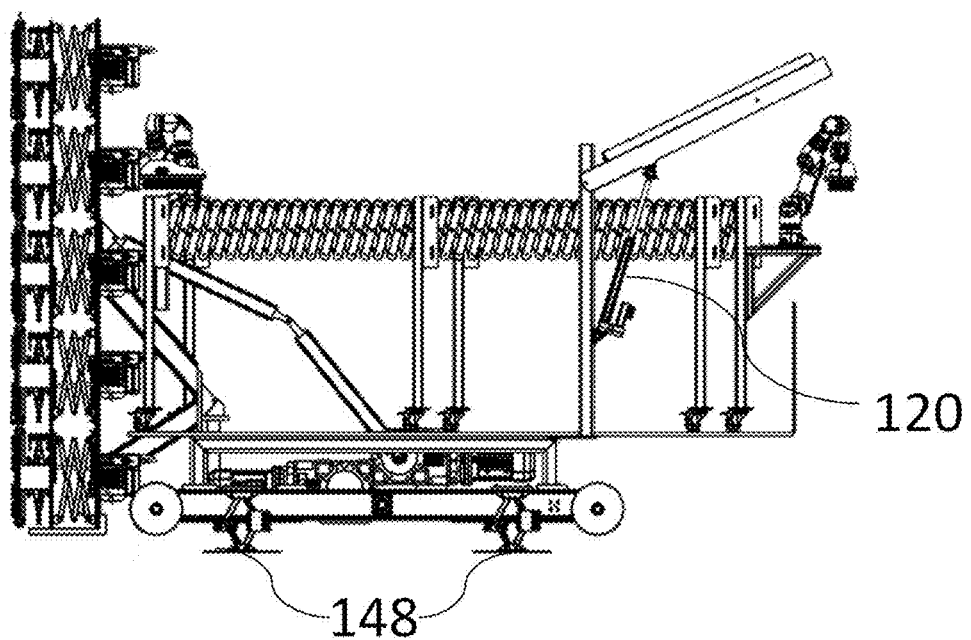
FIG. 7 illustrates the apparatus depicting a placement actuator, in accordance with an embodiment of the present disclosure.

The apparatus 100 further comprises a placement actuator 120. The placement actuator 120 is configured to lift and lower the BC 118. The placement actuator 120 may also be referred as BC placement actuator and interchangeably used herein. The placement actuator is an electromechanical actuator wherein the stroke of the actuator is 'p' mm (e.g., say 300 mm). The placement actuator 120 is fixed to a frame of the BC 118 (also referred as BC frame) that is mounted on the LUP 102. FIG. 7 illustrates the apparatus 100 depicting the placement actuator 120, in accordance with an embodiment of the present disclosure. FIG. 7 further depicts a jack system that is connected underneath the UDS 114. The jack system is configured to level the apparatus 100 with reference to a ground surface and lift the apparatus to a desired position. In other words, in the present disclosure, the jack system is an electric jack that each of which can take on "x tonnes (e.g., where x is 1.5 tonnes (or tons or also referred as 1500 kilograms)) of load". This is attached below the UDS 114 and is always in collapsed condition. During an initial set up process, if there is a need for levelling, the jack system is electrically operated (via mains supply or requisite battery power as applicable) for touching the ground surface and thereby starts lifting the apparatus 100. Once necessary setting up is done and before the start of one or more operations, the jack system is again collapsed back to its original configuration.

Figure 8:
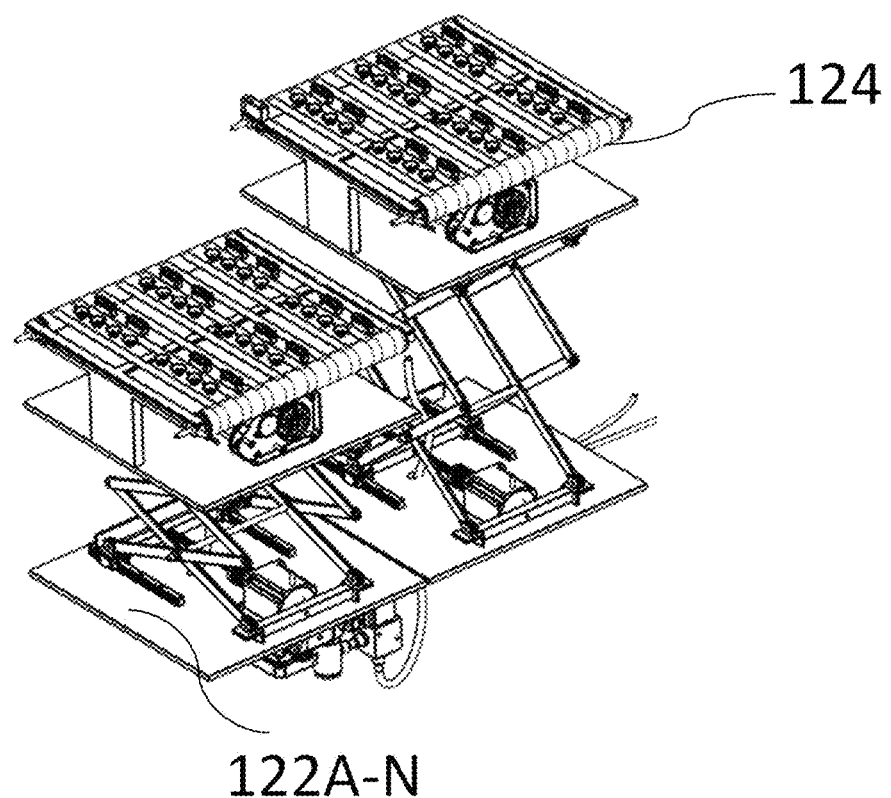
FIG. 8 illustrates a portion of the apparatus depicting an object gripping and conveying system (OGCS), in accordance with an embodiment of the present disclosure.

The apparatus 100 further comprises one or more object gripping and conveying systems (OGCS) 126 (refer FIG. 6). FIG. 8 illustrates a portion of the apparatus 100 depicting the OGCS 122A-N, in accordance with an embodiment of the present disclosure. Each of the OGCS 122A-N comprises a split belt conveyor (SBC) 124. The SBC 124 is operated by a drum motor and lifted and lowered by a split belt lift mechanism (SLM) 134.

Figure 9:
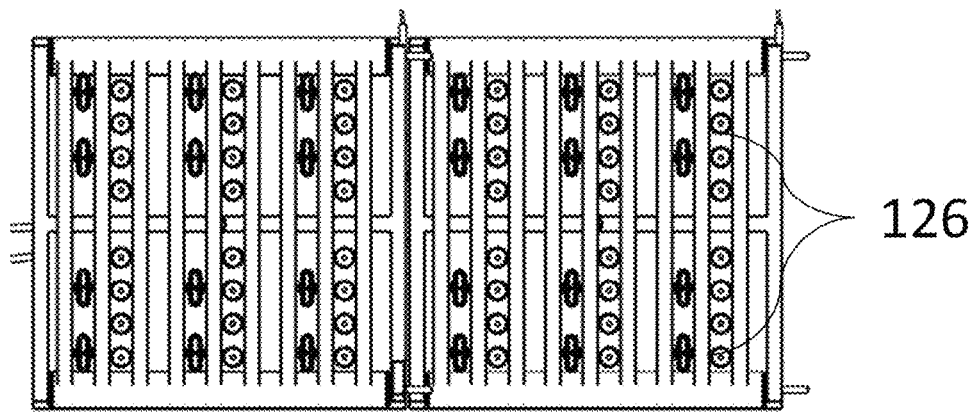
FIG. 9 illustrates a portion of the apparatus depicting one or more object gripping systems (OGS), in accordance with an embodiment of the present disclosure.

The apparatus 100 further comprises one or more object gripping systems (OGS) 126. Each of the one or more OGSs 126 is mounted on the one or more OGCS 122A-N respectively. Each of the OGSs 126 comprises the plurality of suction panels 128A-N (refer FIG. 6). FIG. 9 illustrates a portion of the apparatus 100 depicting the one or more object gripping systems (OGS) 126, in accordance with an embodiment of the present disclosure.

Figure 10:
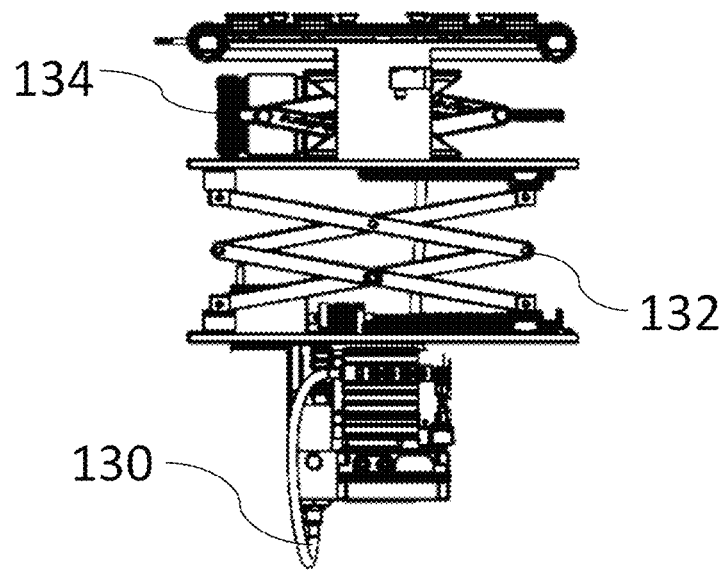
FIG. 10 illustrates a portion of the apparatus depicting one or more vacuum generators, in accordance with an embodiment of the present disclosure.

The apparatus 100 further comprises one or more vacuum generators 130 that are configured to generate vacuum for the plurality of suction panels 128A-N. FIG. 10 illustrates a portion of the apparatus 100 depicting the one or more vacuum generators 130, in accordance with an embodiment of the present disclosure. The one or more vacuum generators 130 generate enough vacuum for all the suction panels in the plurality of OGSs 126. The generated vacuum is distributed through one or more main lines (e.g., 4 main lines in the present disclosure). There are 5 such vacuum generators (not shown in FIGS.) for the entire apparatus 100.

As mentioned above, the OGS 126 is mounted on the OGCS 128A-N. The OGS 126 has array of suction cups of different shapes (also referred as plurality of suction panels comprising suction cups). The suction cups are operated by the vacuum generator. The apparatus 100 further comprises an object gripping panel lift mechanism 132 configured to lift or lower the plurality of suction panels (128A-N) for performing at least one of the first operation (e.g., loading operation) and the second operation (e.g., unloading operation) of one or more objects from a first zone (e.g., first location) to a second zone (e.g., second location).

Figure 11:
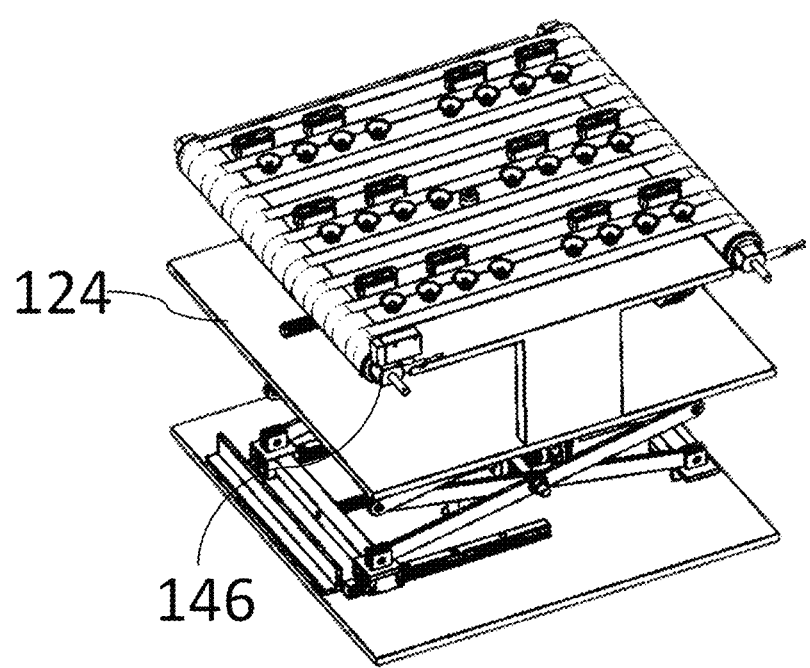
FIG. 11 illustrates portion of the apparatus depicting the object gripping and conveying system (OGCS) having a vision camera, in accordance with an embodiment of the present disclosure.

The apparatus 100 comprises the SLM 134 that is configured to lift or lower the SBC 124. This is electrically actuated. It is mounted on top of object gripping panel lift mechanism 132 (refer FIG. 9) and can lift the SBC 124 from below or lower. During unloading, before the OGS 126 releases the vacuum the SLM 134 lifts and all the material/objects lie over the SBC 124. Now object gripping panel lift mechanism 132 lowers to the default level in line with the BC, the SBC 124 along with object(s) now start conveying for unloading. During loading, the SLM is in lifted condition and allows the objects to get filled over the object gripping panel lift mechanism 132. Before the MPOHCP 104 starts to rotate to vertical position, the SLM lowers and OGS 126 to grip the objects placed over it. Further, each OGCS 122A-N comprises one or more vision cameras 146 (e.g., refer FIG. 11), and the like. FIG. 11 illustrates a portion of the apparatus depicting the object gripping and conveying system (OGCS) having the vision camera 146, in accordance with an embodiment of the present disclosure. The one or more vision cameras 146 (also referred as vision system and interchangeably used herein) are used to find distance from the OGS 126 to objects which are loaded on/within an environment (e.g., container). The vision cameras 146 pass the command to adjust the height of object gripping panel lift mechanism 132 on which the vision cameras 146 are mounted.

The apparatus 100 further comprises a platform 150 (refer FIG. 1) hinged to the LUP 102. During transportation of the apparatus 100, the platform 150 is configured as a stopper. And during a setting up of the apparatus 100, the platform 150 is configured at a specific angle (e.g., inclined angle) to disembark the FRC 106A and the SRC 106B. Each OGCS platform contains array of suction devices OGS 126, the SBC 124, and the SLM 134 for lifting the SBC 124, wherein all of these mounted on scissor mechanism (e.g., object gripping panel lift mechanism 132). Each panel has vacuum inlet and distribution system for distribution of vacuum to desired components of the apparatus 100. Some panels also house vision cameras/vision system. The MPOHCP 104 is used to grip object and convey into and out of the container. The MPOHCP 104 is made to rotate from vertical to horizontal positions by the 4-bar linkage system (the drive mechanism).

Figure 12A:
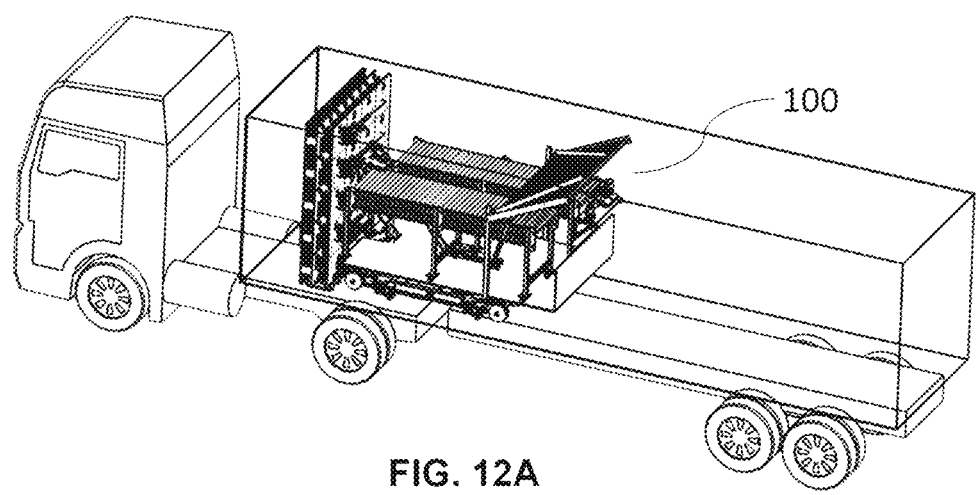
FIGS. 12A through 12C illustrate a scenario depicting configuration of the apparatus during transportation in a vehicle/container, in accordance with an embodiment of the present disclosure.
Figure 12B:
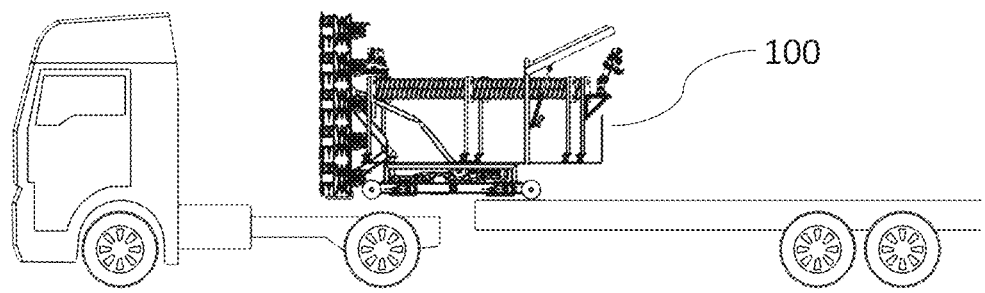
Figure 12C:
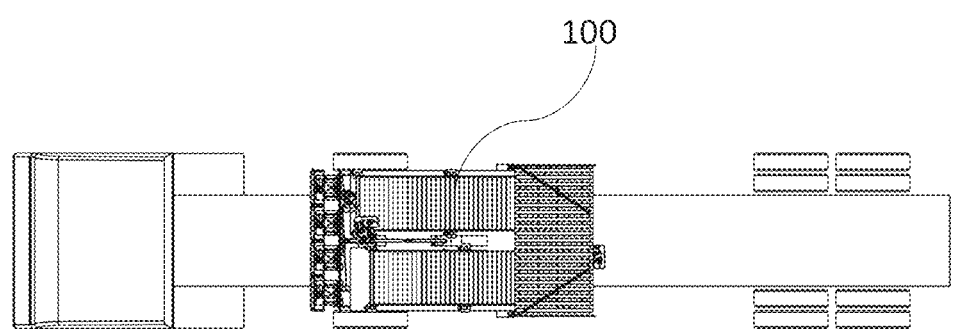

FIGS. 12A through 12C illustrate a scenario depicting configuration of the apparatus 100 during transportation in a vehicle/container, in accordance with an embodiment of the present disclosure.

Figure 13:
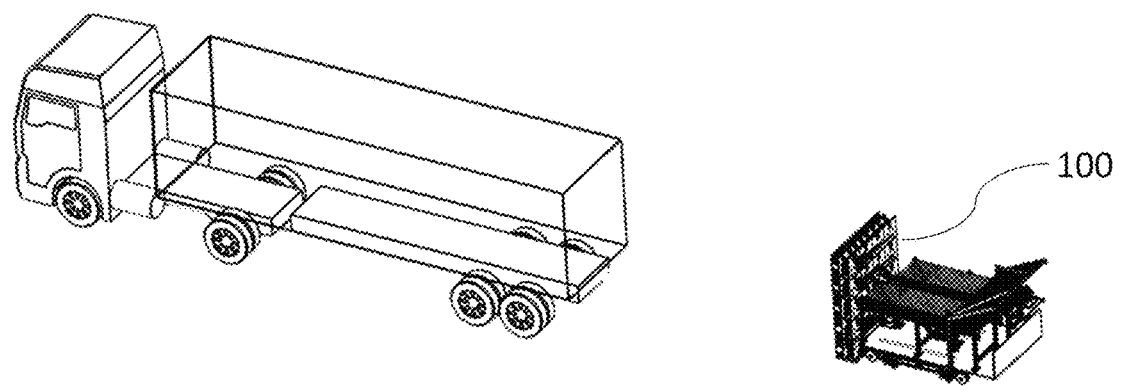
FIG. 13 illustrates a scenario depicting a position of the apparatus at loading and/or unloading bay, in accordance with an embodiment of the present disclosure.

FIG. 13 illustrates a scenario depicting a position of the apparatus 100 at loading and/or unloading bay, in accordance with an embodiment of the present disclosure.

Figure 14:
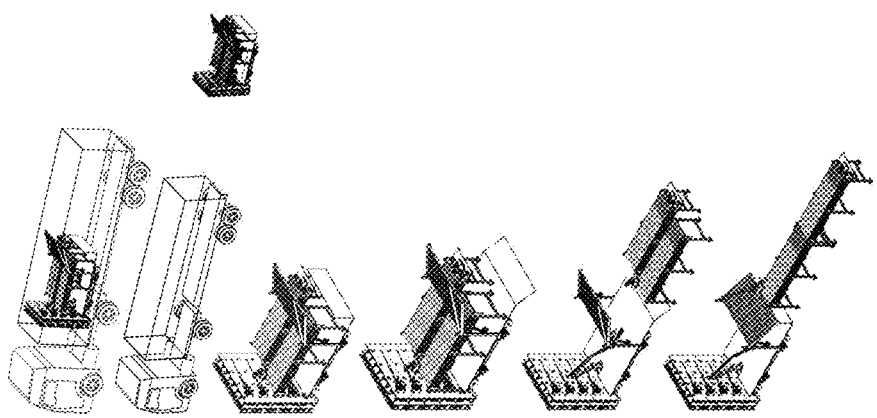
FIG. 14 illustrates a scenario depicting a position of the apparatus during setting up loading and/or unloading bay, in accordance with an embodiment of the present disclosure.

FIG. 14 illustrates a scenario depicting a position of the apparatus 100 during setting up loading and/or unloading bay, in accordance with an embodiment of the present disclosure. In the present disclosure, the apparatus 100 setting up process includes the following steps. At first, a container carrying the apparatus 100 arrives the loading/unloading bay. The apparatus 100 is positioned at loading/unloading bay. The platform 150 is in closed/locked condition and is further lowered to an inclined plane for disembarking the FRC 106A and the SRC 106B from the LUP 102. The BC is connected to the front end of the FRC 106A and the rear end of the FRC is connected to the front end of the SRC 106B. The last castor wheel legs of SRC 106B remain in locked condition and all other caster wheels of the FRC and the SRC are unlocked.

Figure 15:
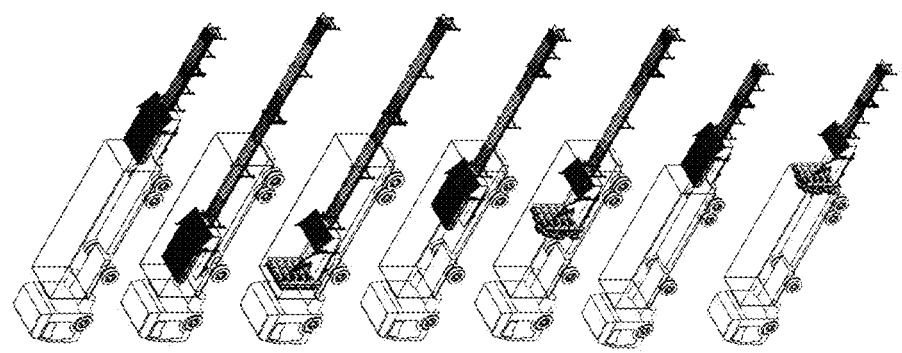
FIG. 15 illustrates a scenario depicting a series of steps performed by the apparatus during a first operation (loading operation), in accordance with an embodiment of the present disclosure.

FIG. 15 illustrates a scenario depicting a series of steps performed by the apparatus 100 during a first operation (loading operation), in accordance with an embodiment of the present disclosure. The first operation is a loading operation. During the first operation (e.g., loading operation), the drive mechanism rotates the MPOHCP to a third direction (CW). Similarly, the BC, the FRC and the SRC rotate in a fourth direction (CCW) to convey one or more objects on the MPOHCP 104. The placement actuator (i) lowers the BC and (ii) connects at least one end (front end) of the FRC, wherein a drum motor is configured to rotate the one or more rollers of the BC in the fourth direction (CCW). One or more motors connected to the FRC and the SRC respectively are configured to rotate one or more associated rollers in the fourth direction (CCW) to enable placement of the one or more objects on the MPOHCP 104. In other words, the one or more motors connected to the FRC and the SRC enable rotation of rollers of the FRC and the SRC in the fourth direction. Further, the SMACM picks and places the one or more objects from an initial position on to the SRC. This ensures that the one or more objects are uniformly distributed by the FMACM based on a size of the one or more objects and space available on the MPOHCP 104. The drive mechanism then (i) rotates the MPOHCP 104 in the fourth direction (CCW), and (ii) releases vacuum for stacking the one or more objects, wherein the one or more objects are pushed by a push mechanism (not shown in FIGS.) The drive mechanism then rotates the MPOHCP 104 in the third direction (CW), and the UDS 114 is configured to move the apparatus 100 to a specific direction for a subsequent operation.

The above loading operation is better understood by way of following description: the drive mechanism rotates the MPOHCP 104 by 90 deg CW. The BC 118, the FRC 106A and SRC 106B rotate in CCW to convey objects on to MPOHCP 104. The SLM 134 is in lifted condition so that the SBC 124 in level with the BC 118, and all associated belts/rollers/conveyors rotate in CCW to allow objects to get conveyed on to MPOHCP 100. The SLM 134 is now lowered and the suction cups of all the relevant suction panels 128A-N of the OGCS 122A-N grips the objects. The SMACM picks and places the objects from pallets/containers on to SRC. The objects are uniformly distributed by FMACM, by diverting based on the size and space available, till MPOHCP 104 is full. The UDS 114 moves the apparatus 100 with objects into the inner most layer of the container wherein the UDS 114 rotates the MPOHCP 104 by 90 deg CCW. Each of the OGS 126 then releases the vacuum, and the objects are now free for stack up in the inner most layer. The OGPLM 132 then actuates the object gripping panel lift mechanism (OGPLM) 132 to push the object stack firmly. The drive mechanism now rotates the MPOHCP 104 by 90 deg CW. The UDS 114 moves back the apparatus 100 by one step for the next layer filling. The above steps are repeated from the inner most layer till the container is filled optimally with high fill volume.

Figure 16:
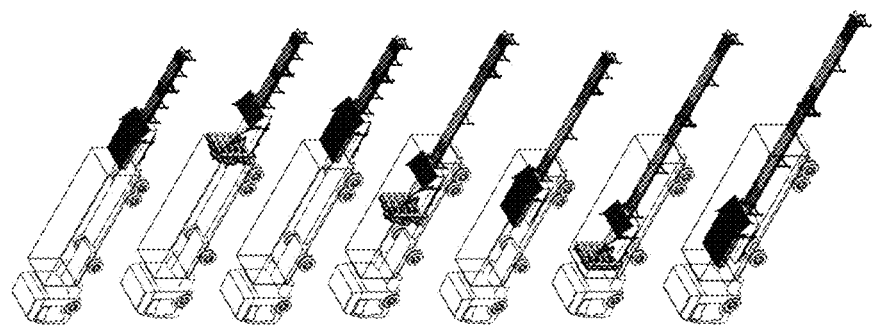
FIG. 16 illustrates a scenario depicting a series of steps performed by the apparatus during a second operation (unloading operation), in accordance with an embodiment of the present disclosure.

FIG. 16 illustrates a scenario depicting a series of steps performed by the apparatus 100 during a second operation (unloading operation), in accordance with an embodiment of the present disclosure. The second operation is an unloading operation. For unloading operation (during the second operation), based on the vision input from the vision cameras, the plurality of suction panels is positioned using the OGPLM 132 based on the distance of one or more objects from the plurality of suction panels for gripping the one or more objects, wherein the distance of the one or more objects is being determined by the one or more vision cameras forming a vision system. All the objects on the outermost layer are gripped in by the plurality of suction panels 128A-N. The SLM 134 will be in lowered position (default) exposing the suction cups of the suction panels 128A-N. The MPOHCP 104 is configured to move forward by the UDS 114 to stabilize next layer of objects. The drive mechanism is configured to rotate in the third direction (CW) for placement of the one or more objects from the second zone to the first zone, the SLM 134 now lifts the OGS 126 and the plurality of suction panels 128A-N releases vacuum to enable resting of the one or more objects on the SBC 124. The OGPLM 132 is configured to lower the SBC 124 to a default position which is in line with BC 118, if any one or more objects are cluttered the FMACM detects such objects and places appropriately on the FRC 106A thus ensuring the objects are organized in a specific manner, else the one or more objects are conveyed from the SBC 124 to the BC 118 towards the FRC 106A and the SRC 106B. The SMACM 116B is configured to pick the one or more objects from the SRC 106B for placement in desired location (or constrained space/open area/container, etc.) wherein the objects are organized in the required manner, and the UDS 114 is configured to move the apparatus to a specific direction for a subsequent operation.

The above unloading operation is better understood by way of following description: At first, based on the vision input the suction panels are positioned individually using OGPLM 132 with respect to the distance of objects from the OGS 126. All the objects are then gripped in bulk by the suction panels, while the SLM 134 is in lowered position, exposing the suction cups of the panels 128A-N. The MPOHCP 104 is then pushed slightly forward by the UDS 114 to stabilize the next layer. The drive mechanism 112 rotates MPOHCP 104 by 90 degrees clockwise so that gripped objects are ready for getting conveyed out. The SLM 134 now lifts and the OGS 126 releases vacuum, so all the objects now rest on the SBC 124. The SBC 124 rotates in clockwise and all the objects over the SBC belts convey them towards the BC 118 and are made to converge towards the FRC 106A. Any misplaced object is gripped and placed properly by FMACM 116A and are conveyed from the FRC 106A to the SRC 106B. At the end of SRC 106B the SMACM 116B picks the objects and places either on pallet or container in the required pattern. After the first layer is unloaded, the MPOHCP 104 is rotated CW by 90 degrees and the apparatus 100 is moved to the next layer by the UDS 14 thus ensuring the objects are unloaded and organized in a specific manner in a given environment (or constrained space/open area/container, etc.). The above steps are repeated from the first layer till inner most portion of the container.

The apparatus 100 further comprises a programmable logic controller (PLC) comprised therein (not shown in FIGS.). The PLC is configured to send, receive and command one or more controls required for performing the one or more operations (e.g., loading, unloading, and setting up the apparatus 100). The apparatus 100 may be further equipped with one or more I/O communication interfaces (as known in the art interfaces) for a human machine interface (HMI) that is configured to enable receiving one or more inputs from one or more users (e.g., operators) for performing the operations described above. The PLC may be further operatively connected with one or more processing units (e.g., a central processing unit (CPU)) to process inputs and produce required outputs (e.g., commands to perform loading operation, unloading operation, setting up the apparatus, and the like). The PLC is further configured with a safety logic to enable safety precautions during normal, abnormal, and one or more emergencies being identified. Safety precautions may include, for example, but are not limited to, overriding the existing instructions (e.g., during loading, unloading, setting up of the apparatus if anomaly or some unavoidable incidents occurs) with new set of instructions such as turn off/shut down of the apparatus 100). Alternatively, a physical emergency button (configured to the apparatus—not shown in FIGS.) may be pressed/pushed/operated. All the instructions may be processed by the PLC and a memory (for temporary/permanent storing of information associated with the operations) comprised in the apparatus and/or the PLC (not shown in FIGS.).

Most conventional equipment manipulating object have been huge with rotatable pivot platforms, multiple roller conveyors, telescopic boom conveyors, hydraulic cranes, etc. These systems tend to have higher lifecycle cost due to their size and bill of materials (BoM) count and are further limited to handle either loading or unloading and lack to perform both the operations. Present disclosure provides the apparatus 100 and for organized loading and unloading of objects. The apparatus 100 addresses the issue of single equipment for both loading, unloading, and further automatically organizes the objects in bulk when the objects are cluttered thus ensuring safety, without damages. The objects are placed optimally while being unloaded onto pallets or other carriers. While loading into a container or in any environment, including open area/space, the objects are loaded to a greater fill volume (e.g., say allocated or designated area). These operations of multiple objects handling in one go are enabled to various components of the apparatus 100 such as belt conveyors (or bridge conveyors, rollers of the conveyors, manipulators (e.g., say robotic arm or any other object handling component), vacuum generators for providing vacuum to suction cups of the suction panels that enable object gripping and conveying platforms, and object gripping systems to grip bulk/multiple objects at a given time instance and place in desired location(s).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An apparatus for organized loading, and unloading of a plurality of objects comprising:
 a loading and unloading platform (LUP);
 a multi-panel object holding and conveying platform (MPOHCP) connected to the LUP;
 a first roller conveyor (FRC) and a second roller conveyor (SRC) mounted on the LUP, each of the FRC and the SRC comprises a first end and a second end, wherein the second end of the FRC is connected to the first end of the SRC, and wherein each of the FRC and the SRC comprises of a plurality of wheels on a plurality of caster wheel legs respectively;
 a drive mechanism, comprising links and joints, connected to the LUP and the MPOHCP, wherein the drive mechanism is configured to rotate the MPOHCP from a first direction to a second direction;
 a Unit Drive configured to move the LUP and the MPOHCP in one or more directions based on at least one of a first operation and a second operation being performed by the apparatus;
a first m-axis collaborative manipulator (FMACM) and a second m-axis collaborative manipulator (SMACM) mounted on the FRC and the SRC, respectively;
a bridge conveyor (BC) connected to the first end of the FRC;
a placement actuator, is an electromechanical actuator, configured to lift and lower the BC;
one or more object gripping and conveying systems (OGCS), wherein each of the OGCS comprises a split belt conveyor (SBC), and wherein the SBC is operated by a drum motor and lifted and lowered by a split belt lift;
one or more object gripping systems (OGS) mounted on the one or more OGCS respectively, wherein the each of the one or more OGSs comprises a plurality of suction panels;
one or more vacuum generators configured to generate vacuum for the plurality of suction panels; and
an object gripping panel lift configured to lift or lower the plurality of suction panels for performing at least one of the first operation and the second operation of one or more objects from a first zone to a second zone.

2. The apparatus of claim 1, wherein during the first operation and the second operation a last caster wheel leg of the SRC is configured in a first position and remaining caster wheel legs of the SRC and the one or more caster wheel legs of the FRC are configured in a second position.

3. The apparatus of claim 1, wherein the drive mechanism comprises:
a first link comprising a first joint, a second joint, and a third joint, wherein the first joint is connected to a specific location of the MPOHCP and the third joint is connected to a pivot mounted on the LUP; and
a second link comprising a first end and second end, wherein the first end of the second link is connected to the first link via the second joint and the second end of the second link is connected to a crank that is driven by a motor comprising a brake and an encoder, and wherein the motor is mounted on the LUP.

4. The apparatus of claim 1, wherein the FMACM is mounted on the first end of the FRC and the SMACM is mounted on the second end of the SRC, respectively.

5. The apparatus of claim 1, wherein during the first operation,
the drive mechanism is configured to rotate the MPOHCP to a third direction,
the BC, the FRC and the SRC are configured to rotate in a fourth direction to convey one or more objects on the MPOHCP,
the placement actuator is configured to (i) lower the BC and (ii) connect at least one end of the FRC,
wherein a drum motor is configured to rotate the one or more rollers of the BC in the fourth direction, and
wherein one or more motors connected to the FRC and the SRC respectively are configured to rotate one or more associated rollers in the fourth direction to enable placement of the one or more objects on the MPOHCP,
the SMACM is configured to pick and place the one or more objects from an initial position on to the SRC, wherein the one or more objects are uniformly distributed by the FMACM based on a size of the one or more objects and space available on the MPOHCP,
the drive mechanism is configured to (i) rotate the MPOHCP in the fourth direction, and (ii) release vacuum for stacking the one or more objects, and wherein the one or more objects are pushed by a push mechanism, and
the drive mechanism is configured to rotate the MPOHCP in the third direction, and the UDS is configured to move the apparatus to a specific direction for a subsequent operation.

6. The apparatus of claim 5, wherein during the second operation,
the plurality of suction panels is positioned using the OGPLM based on the distance of one or more objects from the plurality of suction panels for gripping the one or more objects, wherein the distance of the one or more objects is being determined by a vision system,
the MPOHCP is configured to move forward by the UDS,
the drive mechanism is configured to rotate in the third direction for placement of the one or more objects from the second zone to the first zone,
the plurality of suction panels releases vacuum to enable resting of the one or more objects on the SBC;
the OGPLM is configured to lift the SBC with the one or more objects for placement by the FMACM from the BC towards the FRC and the SRC, and
the SMACM is configured to pick the one or more objects from the SRC for placement in desired location, and
the UDS is configured to move the apparatus to a specific direction for a subsequent operation.

7. The apparatus of claim 1, further comprising a platform hinged to the LUP.

8. The apparatus of claim 7, wherein during transportation of the apparatus the platform is configured as a stopper.

9. The apparatus of claim 7, wherein during a setting up of the apparatus the platform is configured at a specific angle to disembark the FRC and the SRC.

10. The apparatus of claim 1, further comprising a jack system that is connected underneath the UDS, wherein the jack system is configured to level the apparatus with reference to a ground surface and lift the apparatus to a desired position.

* * * * *